United States Patent [19]

Bertolini et al.

[11] Patent Number: 5,050,350

[45] Date of Patent: Sep. 24, 1991

[54] INNER TRIM PANEL FOR A VEHICLE DOOR, CORRESPONDING DOOR, AND METHOD FOR MOUNTING THE DOOR

[75] Inventors: Carlo Bertolini, Paris; Philippe Becceril, Darvoy; Patrice Cardine, Orleans, all of France

[73] Assignee: Rockwell Automotive Body Systems S.A., France

[21] Appl. No.: 542,337

[22] Filed: Jun. 22, 1990

[30] Foreign Application Priority Data

Jun. 27, 1989 [FR] France .................................. 89 08550

[51] Int. Cl.⁵ .............................................. B60J 5/04
[52] U.S. Cl. ........................................ 49/502; 49/166; 49/348; 49/506
[58] Field of Search ................. 49/502, 503, 506, 348, 49/166

[56] References Cited

U.S. PATENT DOCUMENTS

| 2,707,320 | 5/1955 | Fish | 49/502 X |
| 4,648,208 | 3/1987 | Baldamus et al. | 49/502 |
| 4,704,822 | 11/1987 | Srock et al. | 49/502 |

Primary Examiner—Philip C. Kannan

[57] ABSTRACT

This panel is provided on its face turned towards the inside of the door with means for the fastening and preassembly on this panel of internal elements (8, 11, 12, 13, 14, 15) of the door, in particular window lift (8), lock (12), slide (11) for guiding and locking the window in the lowered position, and inside opening control (13), and these elements are provided with means for fastening to a panel (2) forming a structure inside the door. This arrangement considerably simplifies the structure of the door by eliminating an internal plate supporting the elements, while at the same time enabling the trim panel (7) to be disassembled easily, and consequently servicing to be carried out on the various elements.

6 Claims, 4 Drawing Sheets

FIG_1

FIG_2

FIG_3

INNER TRIM PANEL FOR A VEHICLE DOOR, CORRESPONDING DOOR, AND METHOD FOR MOUNTING THE DOOR

The subject of the present invention is an inner trim panel for a vehicle door, the vehicle door equipped with this panel and a method for mounting this door.

Vehicle doors are known in which the various internal elements (window lift, lock, linkage, slide for guiding the lower part of the window, inside opening control . . . ) are assembled through the panel forming a structure inside the door and are then covered internally with a trim panel.

So-called cassette doors are also known in which the various abovementioned elements are preassembled on a sheet-metal plate which partially closes again the opening made in the inner panel. The positioning of the inner trim panel ensures the completion of the door by covering this plate.

The object of the invention is to avoid the use of an inner plate whilst at the same time preserving the preassembly of the various elements.

According to the invention, the trim panel is provided, on its face turned towards the inside of the door, with means for the fastening and preassembly on this panel of internal elements of the door, in particular window lift, lock, slide for guiding the window into the lowered position, inside opening control, and these elements are provided with means for fastening to the panel forming a structure inside the door.

The vehicle door thus formed is characterized in that the said elements are fastened, on the one hand, to that face of the trim panel turned towards the inner panel and, on the other hand, to the said inner panel after mounting, which inner panel and trim panel are provided with fastening means for the said elements.

This arrangement therefore considerably simplifies the structure of the door and very substantially reduces its cost price by eliminating the abovementioned inner plate. Furthermore, servicing of one or other of the elements or mechanisms inside the door is made particularly easy since it is sufficient to take off just the trim panel, by removing its link with the various elements which, moreover, remain fastened to the inner panel of the door.

Other features and advantages of the invention will emerge during the description which follows, made with reference to the attached drawings which illustrate, by way of non-limiting example, one of its embodiments.

Figure 1:
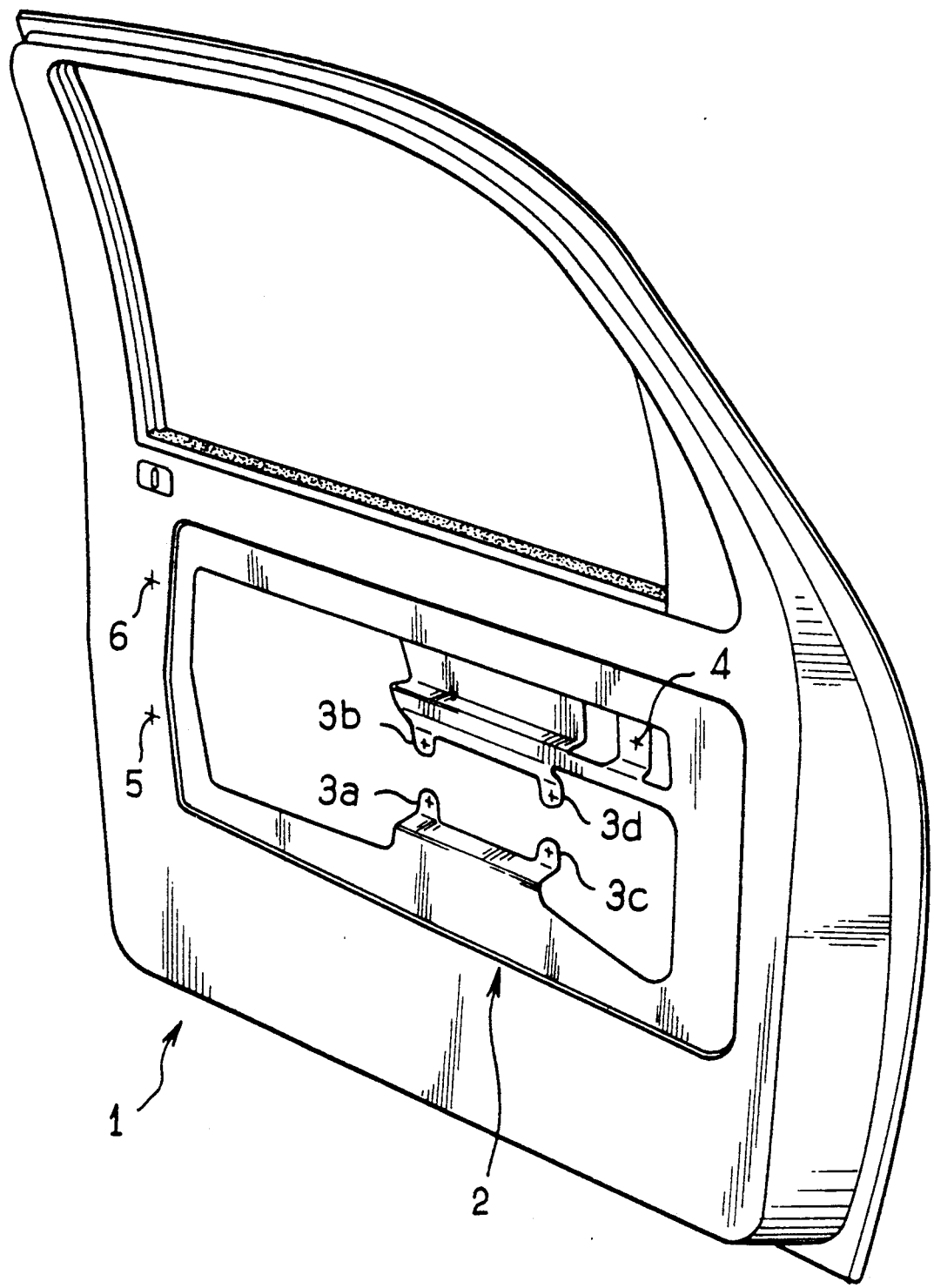
FIG. 1 is a perspective view of a vehicle door without its inner trim panel but having an inner panel adapted so as to enable elements or mechanisms of the door to be fastened therein.

In FIG. 1, a motor vehicle door 1 can be seen, comprising a panel 2 forming an internal structure, provided with various means 3a-3b, 3c-3d, 4, 5, 6 arranged so as to enable a certain number of elements or mechanisms inside the door 1 to be fastened onto this inner panel 2.

The means 3a-3b and 3c-3d may, as shown, be lugs which have been cut in the metal sheet of the inner panel 2 and pierced with threaded holes for receiving screws, not shown. The same applies for the fastening points 4, 5 and 6 whose role will be explained hereinbelow.

Figure 2:
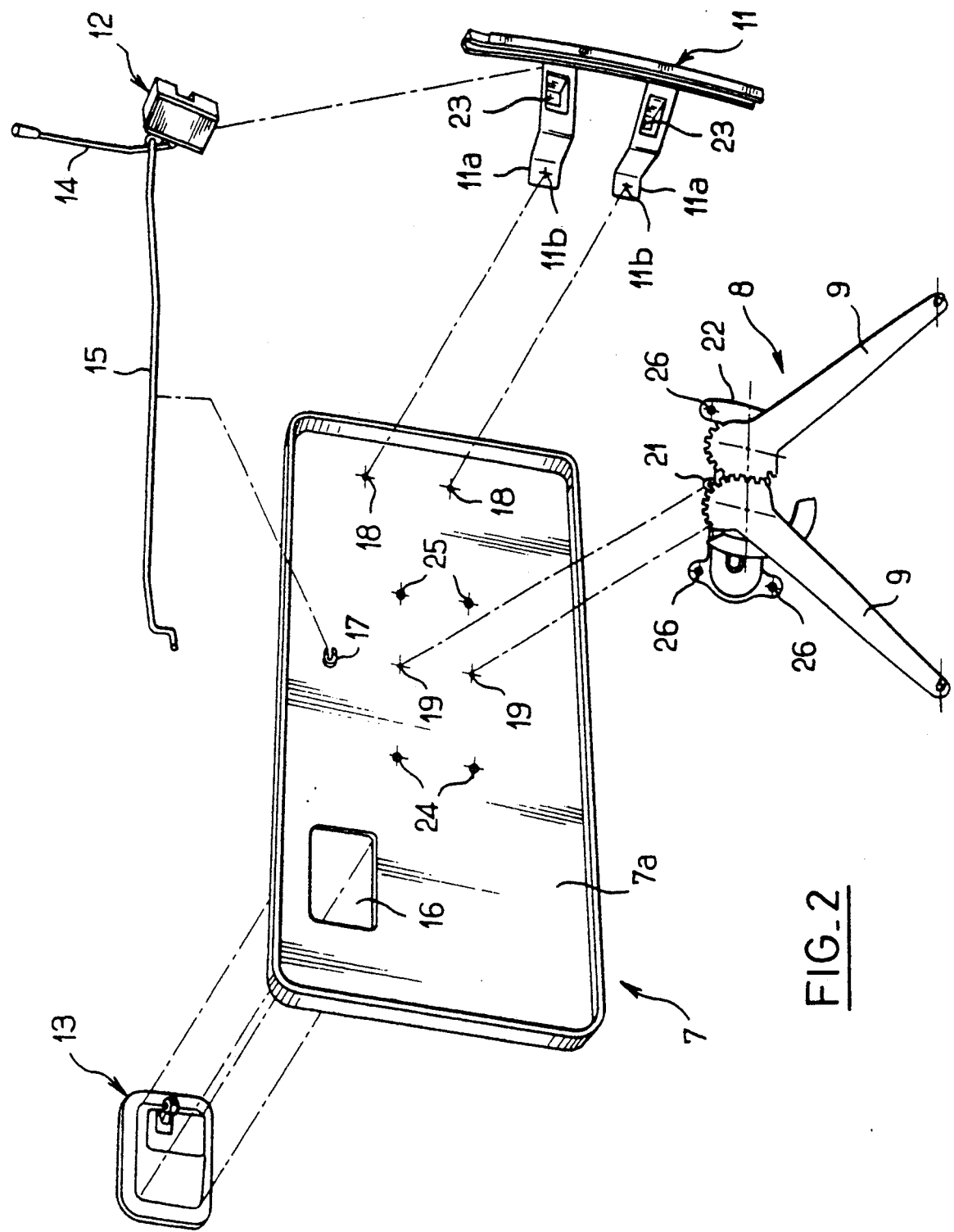
FIG. 2 is a perspective exploded view of an embodiment of the trim panel of the door and of a certain number of elements which may be fastened therein.
Figure 3:
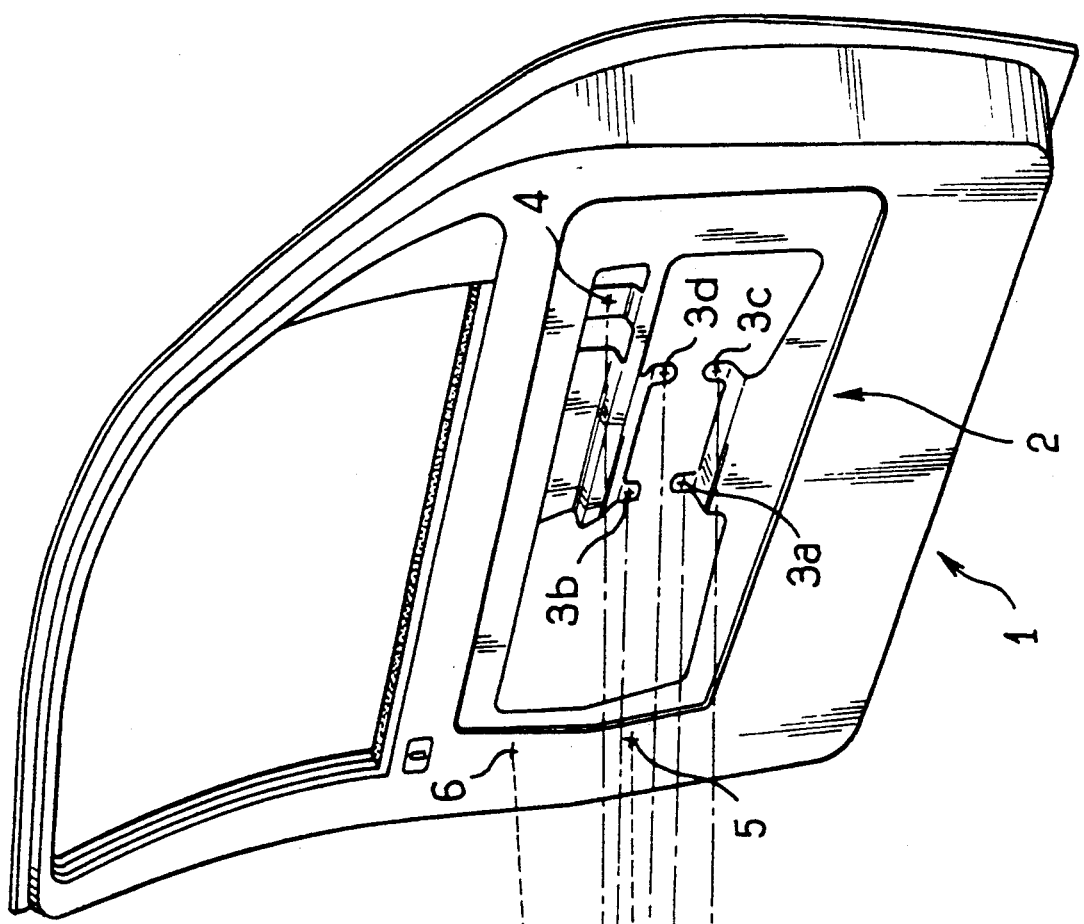
FIG. 3 is a perspective exploded view of the door in FIG. 1 and of the inner trim panel of FIG. 2 on which the various elements have been preassembled.

The door 1 is completed on the inside by a trim panel 7, which can be seen, in particular, in FIGS. 2 and 3 and which is provided, on its face 7a turned towards the inside of the door 1, with means for the fastening and preassembly of internal elements of the door. These elements or mechanisms may, in particular, be a window lift 8, for example of the type with swinging arms 9, a rear slide 11, known per se and which serves to guide the window into the lowered position, a lock 12, an inside opening control 13, 15 and a rod 14 for latching and unlatching the lock 12.

The trim panel 7 is pierced with an opening 16 for introducing the inside opening control 13, and equipped with a clip 17 for clipping onto and securing the rod 15, arranged on its inner face 7a. Also pierced in the panel 7 are holes 18 intended to receive members for fastening the slide 11 to the panel 7, such as screws passing through threaded holes 11b of two tabs 11a of this slide, and two holes 19 for screws, not shown, for fastening the window lift 8 to the panel 7, passing through threaded holes 21 of the plate 22 of the window lift 8.

In a complementary manner, the tabs 11a are pierced with threaded holes 23, intended to interact with the holes 5 and 6 of the surround of the panel 2. These holes are positioned so as to face the holes 23 when the trim panel 7 on which the various elements 8, 11, 13, 14, 15 have been preassembled is to be fixed onto the inner panel 2. Lastly, two pairs of holes 24, 25, positioned in order to face corresponding holes 26 arranged at the opposite ends of the plate 22 of the window lift 8, are pierced in the trim panel 7 on either side of the holes 19. The holes 3a, 3b of the inner panel 2 are positioned in order to face the holes 26 and 19, and the same applies for the holes 3c, 3d and the holes 26, 25. Screws may thus pass successively through the holes 19, 26, 3c, 3d, on the one hand, and the holes 25, 26, 3a and 3b, on the other hand, so as to fix the window lift 8 to the inner door panel 2 after it has been preassembled with the trim panel 7.

In a similar manner, a hole capable of receiving a screw, not shown, which may be screwed into the corresponding threaded hole 4 of the door panel 2, is pierced in the inside opening control 13.

The various elements shown 8, 11, 12, 13, 14, 15 may, of course, be supplemented by other mechanisms and their fixing to the panel 7 may be effected by any known means other than screws, for example by elastic fasteners.

Figure 4:
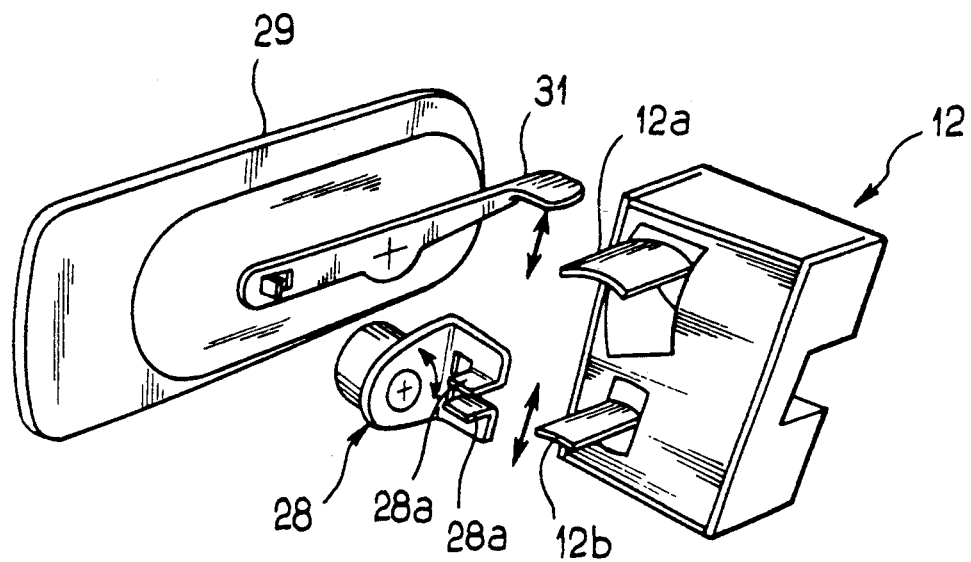
FIG. 4 is an exploded perspective view, on a larger scale, of the lock of the door, of its opening handle, of the lock cylinder and of the link members between these various elements.
Figure 5:
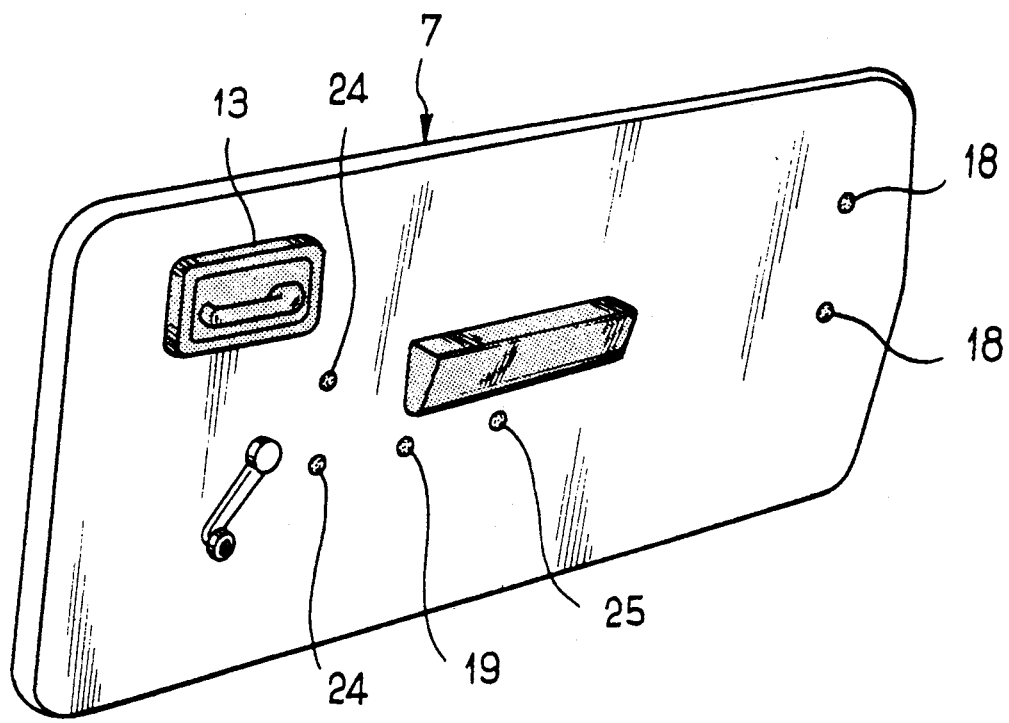
FIG. 5 is a perspective view of the trim panel from inside the vehicle.

The lock 12 is equipped with two tongues 12a, 12b and with a cylinder 28, while the opening handle 29 has a lever 31. The downward tilting of the latter (double arrow in FIG. 4) actuates the upper tongue 12a in order to permit the opening of the door, while the rotation of the cylinder 28 controls the displacement of the lower tongue 12b, introduced between two lugs 28a of the cylinder 28, in order to latch or unlatch the lock 12.

The method which has just been described for mounting the door is carried out as follows.

The various elements 8, 11, 12, 13, 14, 15 etc are first premounted on the trim panel 7 by introducing the inside control 13 into the opening 16, positioning the rod 15 in the elastic clip 17, and screwing in the window lift 8 with screws fixing the trim panel 7 through the holes 19, and the threaded holes 21, and lastly the slide 11 by screwing the screws into the holes 18 and the threaded holes 11b. The lock 12 is in this case fixed to the slide 11 via an auxiliary tab, not shown.

The unit formed in this way is then mounted on the door by fixing the panel 7 onto the panel 2 by any known means, not shown, for example elastic fasteners, adhesive bonding, screwing ... Lastly, the elements 8, 11, 13 are fixed to the inner panel 2 by screws, as described above, passing through the holes 24, 25 of the panel 7, 26 of the window lift 8 and 3c, 3d, 3a, 3b of the panel 2. Other screws pass through the holes 23, 5 and 6 in order to fix the slide 11 to one edge of the inner panel 2.

The fixing of the lock 12 to the inner panel 2 is similarly obtained by screwing the latter onto the rear edge of the door 1.

In order to disassemble the trim panel 7 so as to enable servicing of the various internal elements 8, 11 ..., to begin with only the connections between the panel 7 and the elements 8, 11 are disassembled, and then the screw connecting the control 13 and the hole 4. The rod 15 is then disconnected from the control handle 13 and the panel 7 is withdrawn, leaving the elements 8, 11, 12 fixed to the inner door panel 2, which enables the panel 7 to be removed.

It is therefore easier to carry out the servicing operations of the maintenance or replacement of the elements, and the structure of the door is simplified, which reduces its cost price relative to doors having an inner plate.

We claim:

1. A door assembly including a door panel providing structural integrity for said assembly and defining an opening therein comprising:
    a trim panel;
    means for fastening said trim panel to said door panel;
    a window lift and a window slide disposed on said trim panel for guiding a window;
    a lock disposed on said trim panel;
    an inside opening control disposed on said trim panel;
    a rod disposed on said trim panel for actuating said lock;
    said opening providing access to assemble said trim panel having said window lift, lock, inside opening control and rod disposed therein, as a preassembled unit such that said opening is sealed by said trim panel; and
    wherein said window lift is disposed on said trim panel by means of fasteners which engage said trim panel, said window lift and said door panel.

2. The invention of claim 1 wherein said lock is disposed on said trim panel by means of fasteners which engage said trim panel, said lock and said door panel.

3. The invention of claim 1 wherein said slide is disposed on said trim panel by means of fasteners which engage said trim panel, said slide and said door panel.

4. The invention of claim 1 wherein said inside opening control is disposed on said trim panel by means of fasteners which engage said trim panel, said inside opening control and said door panel.

5. The invention of claim 1 wherein said lock, slide and inside opening control is disposed on said trim panel by means of fasteners which engage said trim panel, said lock and said door panel.

6. A method for assembling a vehicular door including a door panel having an opening and a trim panel for covering said opening comprising the steps of:
    premounting an inside opening control, a window lift, a slide, and a lock to said trim panel;
    installing said trim panel in said opening of said door panel; and
    installing fasteners to affix said inside opening control, window lift, slide and lock to said trim panel and said door panel.

* * * * *